(12) United States Patent
Mito et al.

(10) Patent No.: US 11,929,525 B2
(45) Date of Patent: Mar. 12, 2024

(54) FUEL CELL STACK

(71) Applicant: HONDA MOTOR CO., LTD., Tokyo (JP)

(72) Inventors: Toshinobu Mito, Wako (JP); Yoshio Kajita, Wako (JP); Kenta Watanabe, Wako (JP); Shuhei Goto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 17/680,239

(22) Filed: Feb. 24, 2022

(65) Prior Publication Data
US 2022/0302473 A1  Sep. 22, 2022

(51) Int. Cl.
*H01M 8/0267* (2016.01)
*H01M 8/026* (2016.01)
*H01M 8/0265* (2016.01)

(52) U.S. Cl.
CPC ......... *H01M 8/0267* (2013.01); *H01M 8/026* (2013.01); *H01M 8/0265* (2013.01)

(58) Field of Classification Search
None
See application file for complete search history.

(56) References Cited

U.S. PATENT DOCUMENTS

| | | | | |
|---|---|---|---|---|
| 2004/0106028 | A1* | 6/2004 | Sugiura | H01M 8/0258 429/514 |
| 2007/0154747 | A1* | 7/2007 | Darling | H01M 8/04134 429/513 |
| 2019/0074525 | A1* | 3/2019 | Tomana | H01M 8/0276 |
| 2019/0288302 | A1 | 9/2019 | Nonoyama | |

FOREIGN PATENT DOCUMENTS

JP  2006-252973 A  9/2006
JP  2019-160560 A  9/2019

OTHER PUBLICATIONS

Office Action dated Jan. 10, 2023 issued over the corresponding Japanese Patent Application No. 2021-045922 with the English translation thereof.

* cited by examiner

*Primary Examiner* — Alix E Eggerding

(74) *Attorney, Agent, or Firm* — Carrier, Shende & Associates; Joseph P. Carrier; Fulchand P. Shende

(57) ABSTRACT

A coolant flow field of a fuel cell stack includes a power-generation-portion-cooling flow path including a portion overlapping a power generation section of a membrane electrode assembly, a bypass flow path provided on outer peripheries of separators, a main supply flow path extending from a coolant supply passage through the bypass flow path and communicating with the power-generation-portion-cooling flow path, and a bubble release flow path extending from an upper portion of the coolant supply passage in the gravity direction toward the bypass flow path and communicating with the bypass flow path, wherein the bubble release flow path extends upward in the gravity direction above the coolant supply passage.

8 Claims, 9 Drawing Sheets

COMPARATIVE EXAMPLE

FUEL CELL STACK

CROSS-REFERENCE TO RELATED APPLICATIONS

This application is based upon and claims the benefit of priority from Japanese Patent Application No. 2021-045922 filed on Mar. 19, 2021, the contents of which are incorporated herein by reference.

BACKGROUND OF THE INVENTION

Field of the Invention

The present invention relates to a fuel cell stack in which a coolant flow field is provided inside a pair of separators joined together.

Description of the Related Art

Generally, the solid polymer electrolyte fuel cell employs a solid polymer electrolyte membrane made of a polymer ion exchange membrane. A fuel cell includes a membrane electrode assembly (MEA). The MEA has an anode on one surface of a solid polymer electrolyte membrane and a cathode on the other surface of the solid polymer electrolyte membrane.

The MEA is sandwiched between separators (also referred to as bipolar plates) to form a power generation cell (fuel cell). A predetermined number of the power generation cells are stacked to form a fuel cell stack, and are used, for example, as a power source of a vehicle.

The fuel cell has a fuel gas flow field as one reactant gas flow field between the MEA and one of the separators. The fuel cell also has an oxygen-containing gas flow field as the other reactant gas flow field between the MEA and the other of the separators. The fuel cell has a coolant flow field through which a coolant flows between the one and the other of the separators.

The coolant flows through the coolant flow field to remove heat generated in the power generating portion of the fuel cell and prevent overheating of the MEA. Since the thickness of the coolant flow field is as small as about 200 μm, bubbles in the coolant may remain at the coolant flow field. The remaining bubbles may locally reduce the cooling efficiency in the coolant flow field, locally generate high temperature portions in the MEA, and deteriorate the electrolyte membrane forming the MEA.

JP 2019-160560 A discloses a bypass flow path provided above the power generating portion in the gravity direction. The coolant containing a large number of bubbles has a smaller specific gravity, and thus flows into the upper bypass flow path, thereby being prevented from flowing into the power generating portion.

SUMMARY OF THE INVENTION

However, in the prior art, there is a possibility that part of the bubbles may flow around to the power generating portion along with the flow of the coolant, and there is room for improvement in preventing the bubbles from flowing into the power generating portion.

Accordingly, one object of the present invention is to provide a fuel cell stack capable of directing more bubbles in the coolant into the bypass flow path.

An aspect of the disclosure is a fuel cell stack including a plurality of power generation cells stacked one another, each of the power generation cells including a membrane electrode assembly and a pair of separators sandwiching the membrane electrode assembly, wherein the fuel cell stack includes: a coolant flow field formed inside protruded portions of the separators adjacent to each other; a coolant supply passage allowing a coolant to flow into the coolant flow field; and a coolant discharge passage allowing the coolant to flow out of the coolant flow field, wherein the coolant flow field includes a cooling section for cooling the power generating portion, the cooling section overlapping a power generating portion of the membrane electrode assembly; a bypass flow path provided at outer peripheries of the separators, the bypass flow path being formed inside protruded seals for sealing reactant gas flow fields formed between the separators and the membrane electrode assembly; and a main supply flow path extending from a portion of the coolant supply passage on the side of the cooling section for cooling the power generating portion, intersecting the bypass flow path, and extending further toward the cooling section for cooling the power generating portion, the main supply flow path connecting the coolant supply passage and the cooling section for cooling the power generating portion; and a bubble release flow path extending from an upper portion of the coolant supply passage in a gravity direction toward the bypass flow path and connected to the bypass flow path.

The fuel cell stack of the above aspect can direct more air bubbles in the coolant toward the bypass flow path.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a preferred embodiment of the fuel cell stack will be described in detail with reference to the accompanying drawings.

Figure 1:
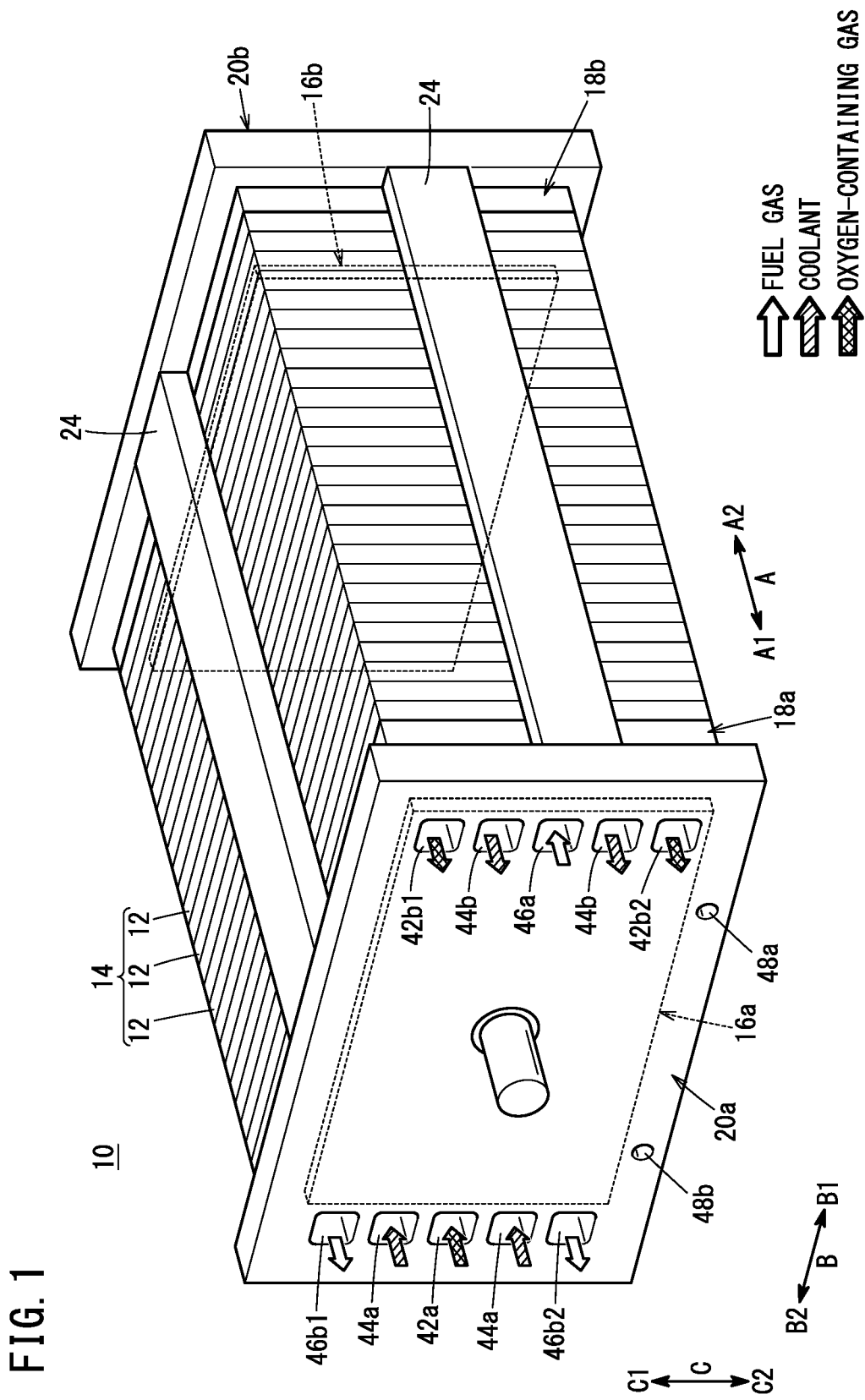
FIG. 1 is a perspective view of a fuel cell stack according to an embodiment.

As shown in FIG. 1, a fuel cell stack 10 according to an embodiment of the present invention includes a stacked body 14 in which a plurality of power generation cells 12 (fuel cells) are stacked in the horizontal direction (direction of the arrow A). The fuel cell stack 10, for example, is mounted in a fuel cell vehicle such as a fuel cell electric automobile (not shown).

A terminal plate 16a, an insulator 18a, and an end plate 20a are arranged in this order outwardly at one end in the stacking direction of the stacked body 14 which is an end in the arrow A1 side. A terminal plate 16b, an insulator 18b, and an end plate 20b are arranged in this order outwardly at the other end of the stacked body 14 in the stacking direction, which is an end on the arrow A2 side.

The end plates 20a, 20b have a horizontally long (or vertically long) rectangular shape, and have connecting bars 24 between sides of the end plates 20a, 20b. Both ends of each connecting bar 24 are respectively fixed to the inner surfaces of end plates 20a, 20b, and a compression load (fastening load) in the stacking direction (direction of the arrow A) is applied to the plurality of stacked power generation cells 12. The fuel cell stack 10 may be provided with a case utilizing the end plates 20a, 20b as end plates of the case, and the stacked body 14 may be housed in the case.

Figure 2:
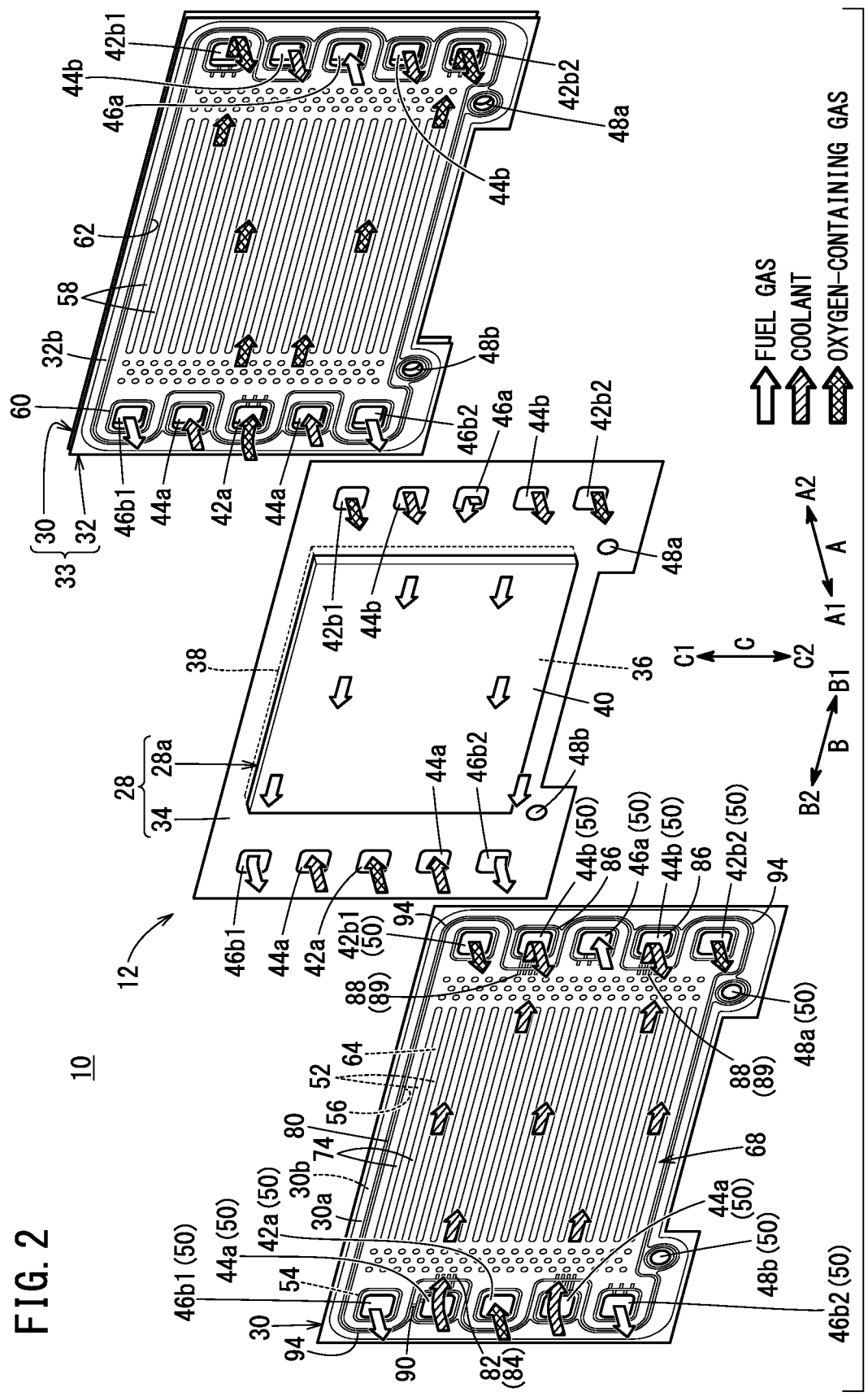
FIG. 2 is an exploded perspective view of the fuel cell (power generation cell) of the fuel cell stack shown in FIG. 1.

The power generation cell 12 has a horizontally long rectangular shape. As shown in FIG. 2, the power generation cell 12 has a resin framed membrane electrode assembly (MEA) 28, and a first separator 30 and a second separator 32 which hold the resin framed MEA 28 from the direction of the arrow A. The first separator 30 and the second separator 32 are obtained by press-molding a thin metal plate into a corrugated shape. Examples of the thin metal plate are a steel plate, a stainless steel plate, an aluminum plate, a plated steel plate, and a thin metal plate whose metal surfaces are anti-corrosion treated.

The first separator 30 and the second separator 32 are joined to each other along a predetermined bonding line to form a joint separator 33. The joint separator 33 has a plurality of joined portions joining the outermost periphery of the first separator 30 and the outermost periphery of the second separator 32 to each other. The joined portions are arranged along the outer periphery of the joint separator 33 with intervals from each other. The bonding line is, for example, a laser welded portion in a shape of a line. The bonding line may be formed by MIG, TIG, seam welding, brazing, caulking, or the like.

In FIG. 2, the resin framed MEA 28 includes a membrane electrode assembly 28a (hereinafter referred to as "MEA 28a") and a resin frame member 34 (a resin frame portion, a resin film). The resin frame member 34 is joined to the outer peripheral portion of the MEA 28a and surrounds the outer peripheral portion. The MEA 28a has an electrolyte membrane 36, a cathode 38, and an anode 40. The cathode 38 is provided on one surface of the electrolyte membrane 36, and the anode 40 is provided on the other surface of the electrolyte membrane 36.

The electrolyte membrane 36 is, for example, a solid polymer electrolyte membrane (cation exchange membrane). The solid polymer electrolyte membrane is formed by impregnating a thin membrane of perfluorosulfonic acid with water, for example. The electrolyte membrane 36 is sandwiched between the cathode 38 and the anode 40. As the electrolyte membrane 36, an HC (hydrocarbon)-based electrolyte can be used in addition to the fluorine-based electrolyte.

Although not shown in detail, the cathode 38 has a first electrode catalyst layer joined to one surface of the electrolyte membrane 36, and a first gas diffusion layer laminated on the first electrode catalyst layer. The anode 40 has a second electrode catalyst layer joined to the other surface of the electrolyte membrane 36, and a second gas diffusion layer laminated on the second electrode catalyst layer.

Instead of using the resin frame member 34, the resin frame of the MEA 28 may be formed by extending the electrolyte membrane 36 outward from the cathode 38 and the anode 40. In this case, frame-shaped films may be provided on both sides of extended portions of the electrolyte membrane 36 that extends outwardly of the cathode 38 and the anode 40.

Each power generation cell 12 has a fuel gas supply passage 46a, a plurality (for example, two) of coolant discharge passages 44b, a first oxygen-containing gas discharge passage 42b1, and a second oxygen-containing gas discharge passage 42b2 at one marginal end portion in the long side (marginal end portion on the arrow B1 side). As shown in FIGS. 1 and 2, the fuel gas supply passage 46a, the plurality of coolant discharge passages 44b, the first oxygen-containing gas discharge passage 42b1, and the second oxygen-containing gas discharge passage 42b2 extend through the stacked body 14, the insulator 18a, and the end plate 20a in the stacking direction (may also pass through the terminal plate 16a), respectively.

In FIG. 2, the fuel gas supply passage 46a, the plurality of coolant discharge passages 44b, the first oxygen-containing gas discharge passage 42b1, and the second oxygen-containing gas discharge passage 42b2 are arranged in the direction of the arrow C (along the short side of the power generation cell 12). Each of the first oxygen-containing gas discharge passage 42b1 and the second oxygen-containing gas discharge passage 42b2 allow the oxygen-containing gas, for example, air, which is one of the reactant gases, to be discharged in the direction of the arrow A. The fuel gas supply passage 46a allows the fuel gas, for example, hydrogen-containing gas, which is the other of the reactant gases, to be supplied in the direction of the arrow A. The coolant discharge passages 44b allow the coolant to be discharged in the direction of the arrow A.

The fuel gas supply passage 46a is disposed between two coolant discharge passages 44b which are spaced apart in the vertical direction. The first oxygen-containing gas discharge passage 42b1 is disposed above the upper coolant discharge passage 44b (on the arrow C1 side). The second oxygen-containing gas discharge passage 42b2 is disposed below the lower coolant discharge passage 44b (on the arrow C2 side).

Each power generation cell 12 has an oxygen-containing gas supply passage 42a, a plurality (for example, two) of coolant supply passages 44a, a first fuel gas discharge passage 46b1, and a second fuel gas discharge passage 46b2 at the other marginal end portion in the long side (marginal end portion on the arrow B2 side). As shown in FIGS. 1 and 2, the oxygen-containing gas supply passage 42a, the plurality of coolant supply passages 44a, the first fuel gas discharge passage 46b1, and the second fuel gas discharge passage 46b2 extend through the stacked body 14, the insulator 18a, and the end plate 20a in the stacking direction (may also pass through the terminal plate 16a), respectively.

In FIG. 2, the oxygen-containing gas supply passage 42a, the plurality of coolant supply passages 44a, the first fuel gas discharge passage 46b1, and the second fuel gas discharge passage 46b2 are arranged in the direction of arrow C (along the short side of the power generation cell 12). The oxygen-containing gas supply passage 42a allows the oxygen-containing gas to be supplied in the direction of the arrow A. Each of the first fuel gas discharge passage 46b1 and the second fuel gas discharge passage 46b2 allows the fuel gas to be discharged in the direction of the arrow A. The coolant supply passages 44a allow the coolant to be supplied in the direction of the arrow A.

The oxygen-containing gas supply passage 42a is disposed between two coolant supply passages 44a spaced apart in the vertical direction. The first fuel gas discharge passage 46b1 is disposed above the upper coolant supply passage 44a (in the direction of the arrow C1). The second fuel gas discharge passage 46b2 is disposed below the lower coolant supply passage 44a (in the direction of the arrow C2).

Each of the power generation cells 12 has a first drain passage 48a and a second drain passage 48b. As shown in FIGS. 1 and 2, the first drain passage 48a and the second drain passage 48b extend through the stacked body 14, the insulator 18a, and the end plate 20a in the stacking direction (may also pass through the terminal plate 16a).

In FIG. 2, the first drain passage 48a is located at an end (lower end) of the power generation cell 12 on the arrow C2 side. The first drain passage 48a is located between the center in the longitudinal direction of the power generation cell 12 and the one end (end on the arrow B1 side) of the power generation cell 12. The first drain passage 48a is positioned on the arrow C2 side of (lower than) the lower end of the second oxygen-containing gas discharge passage 42b2.

The first drain passage 48a communicates with the first oxygen-containing gas discharge passage 42b1 and the second oxygen-containing gas discharge passage 42b2 through a communication path (not shown) provided in the insulator 18b or the end plate 20b. That is, the water that is generated during operation of the power generation cell 12 (during power generation) and led to the first oxygen-containing gas discharge passage 42b1 and the second oxygen-containing gas discharge passage 42b2 is discharged to the outside through the first drain passage 48a.

The second drain passage 48b is located at an end of the power generation cell 12 on the arrow C2 side (lower end). The second drain passage 48b is located between the center in the longitudinal direction of the power generation cell 12 and the other end (end on the arrow B2 side) of the power generation cell 12. The second drain passage 48b is positioned on the arrow C2 side of (lower than) the lower end of the second fuel gas discharge passage 46b2.

The second drain passage 48b communicates with the first fuel gas discharge passage 46b1 and the second fuel gas discharge passage 46b2 through a communication path (not shown) provided in the insulator 18b or the end plate 20b. That is, the water that is generated during operation of the power generation cell 12 (during power generation) and led to the first fuel gas discharge passage 46b1 and the second fuel gas discharge passage 46b2 is discharge to the outside through the second drain passage 48b.

In the following description, the oxygen-containing gas supply passage 42a, the first oxygen-containing gas discharge passage 42b1, the second oxygen-containing gas discharge passage 42b2, the coolant supply passages 44a, the coolant discharge passages 44b, the fuel gas supply passage 46a, the first fuel gas discharge passage 46b1, the second fuel gas discharge passage 46b2, the first drain passage 48a, and the second drain passage 48b are collectively simply referred to as the passages 50.

The arrangement, shape, and size of the passages 50 are not limited to those of the present embodiment. The arrangement, shape, and size of the passages 50 may be appropriately set in accordance with required specifications.

As shown in FIG. 2, the first separator 30 of one power generation cell 12 is stacked on the second separator 32 of another power generation cell 12 adjacent to the one power generation cell 12, and the stacked first separator 30 and second separator 32 are joined by way of welding, caulking, or the like, to form a joint separator 33.

The surface of the first separator 30 facing the membrane electrode assembly 28a is hereinafter referred to as "surface 30b". The surface 30b has first passage seals 54, a first flow field seal 56, and flow field ridges 52. The first passage seal 54, the first flow field seal 56, and the flow field ridges 52 are formed to protrude from the surface 30b. The first passage seals 54 individually surround the passages 50. The first flow field seal 56 is provided along the outer periphery of the first separator 30. The flow field ridges 52 allows the fuel gas to flow into the reaction section. A fuel gas flow field 64 through which the fuel gas flows is formed between the first separator 30 and the membrane electrode assembly 28a. The fuel gas flow field 64 is sealed by the flow field seal provided along the outer peripheral portion of the first separator 30.

The surface of the second separator 32 facing the membrane electrode assembly 28a is hereinafter referred to as "surface 32b". The surface 32b has second passage seals 60, a second flow field seal 62, and a plurality of flow field ridges 58. The second passage seals 60 individually surround the passages 50. The second flow field seal 62 is arranged along the outer periphery of the second separator 32. The plurality of flow field ridges 58 extend along the flow direction of the oxygen-containing gas in the reaction section. The oxygen-containing gas flow field through which the oxygen-containing gas flows is formed between the second separator 32 and the membrane electrode assembly 28a. The oxygen-containing gas flow field is sealed by the second flow field seal 62 provided along the outer peripheral portion of the second separator 32.

In the joint separator 33, the first passage seals 54 of the first separator 30 are arranged to face the second passage seals 60 of the second separator 32. Further, the first flow field seal 56 of the first separator 30 is arranged to face the second flow field seal 62 of the second separator 32. Further, the flow field ridges 52 of the first separator 30 is arranged to face the flow field ridges 58 of the second separator 32 in an alternate manner. The joint separator 33 has a coolant flow field 68 through which the coolant flows the space formed between the protruded portions of the first separator 30 and the protruded portions of the second separator 32.

The coolant flow field 68 will be further described below.

Figure 3:
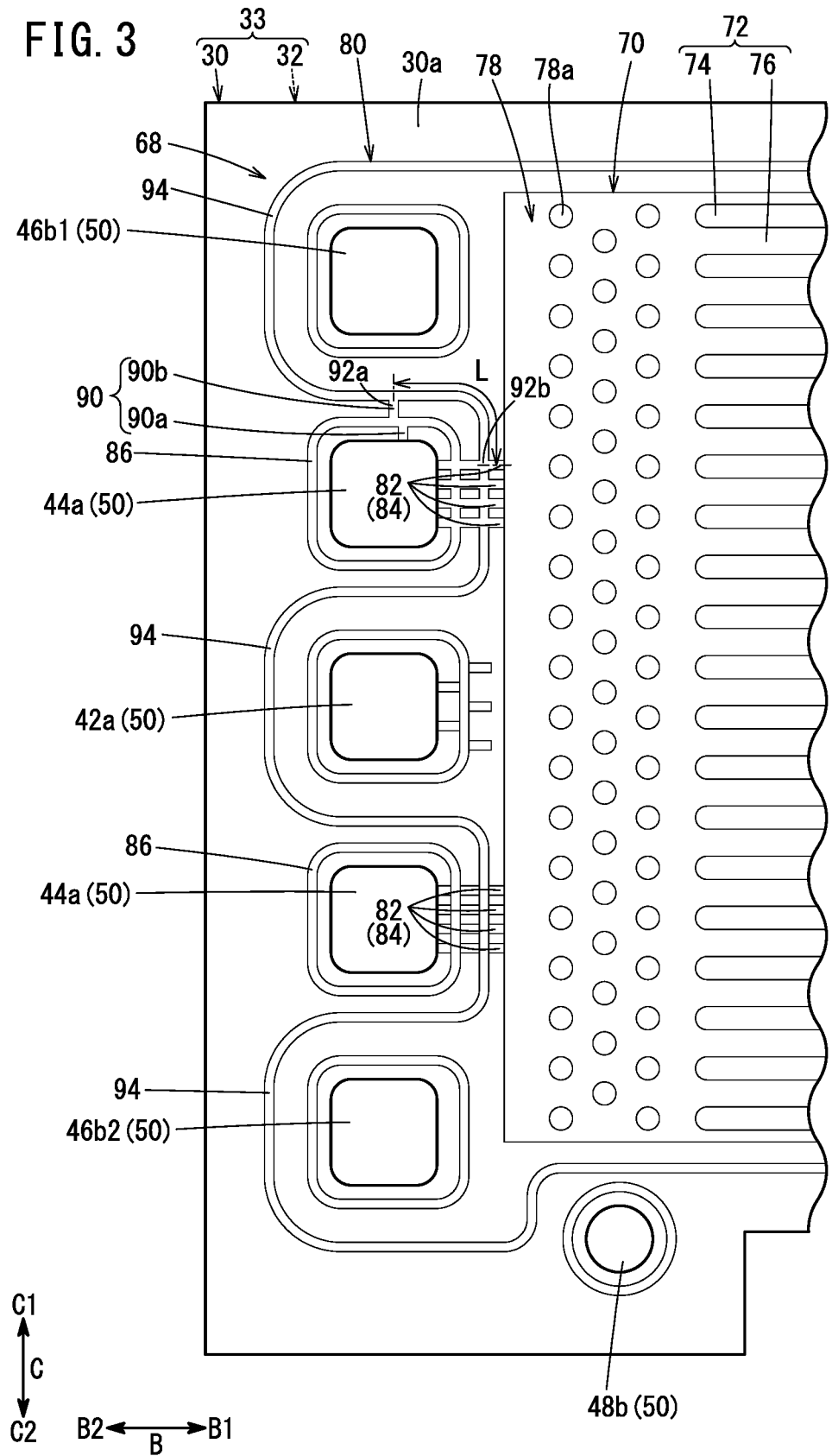
FIG. 3 is a partially enlarged plan view of a separator of the fuel cell shown in FIG. 2.

As shown in FIG. 3, the surface of the first separator 30 facing the second separator 32 is hereinafter referred to as the "inner surface 30a". In the inner surface 30a, back portions of the protruded portions on the surface 30b are recessed accordingly. The recessed portions in the inner surface 30a partly constitute the coolant flow field 68. The coolant flow field 68 has a cooling flow path 70 for cooling the power generating portion at a position overlapping the power generating portion (reaction section) of the electrolyte membrane 36. The cooling flow path 70 for cooling the power generating portion includes a plurality of flow path grooves 74 formed inside the flow field ridges 52 extend in the direction of the arrow B.

The first separator 30 has flat portions 76 between adjacent flow path grooves 74. The flat portions 76 come into contact with the flat portions 76 of the second separator 32 facing each other and close the side portions of the flow path grooves 74. The flow path grooves 74 and the flat portions 76 of the cooling flow path 70 for cooling the power generating portion constitute a region 72 corresponding to the power generating portion. The region 72 corresponding to the power generating portion has a buffer 78 at the end on the arrow B2 side. The buffer 78 has a recessed shape. The buffer 78 has a plurality of projections 78a for distributing the coolant to the flow path grooves 74. The buffer 78 is also provided on the arrow B1 side at the other end of the power generating portion region 72 corresponding to the power generating portion.

The coolant flow field 68 further includes a bypass flow path 80, a surrounding flow path 86, main supply flow paths 82, a bubble release flow path 90, and a main discharge flow paths 88 (see FIG. 2). The bypass flow path 80 is formed by the recesses defined by the protruded portion forming the first flow field seal 56 of the first separator 30 and the protruded portion forming the second flow field seal 62 (see FIG. 2) of the second separator 32. As shown in FIG. 3, the bypass flow path 80 is provided along the outer peripheral portion of the first separator 30 (and the second separator 32). The bypass flow path 80 is disposed around the power generating portion. However, the end portion of the bypass flow path 80 on the arrow B2 side extends outward of the oxygen-containing gas supply passage 42a, the first fuel gas discharge passage 46b1, and the second fuel gas discharge passage 46b2 through which the reactant gases flow, and inward of the two coolant supply passages 44a (between the coolant supply passages 44a and the power generating portion), among the passages 50. Therefore, the end portion of the bypass flow path 80 on the arrow B2 side meanders between the two coolant supply passages 44a and the rest of the passages 50.

As shown in FIG. 2, the end portion of the bypass flow path 80 on the arrow B1 side extends outward of the fuel gas supply passage 46a, the first oxygen-containing gas discharge passage 42b1, and the second oxygen-containing gas discharge passage 42b2 through which the reactant gasses flow, and inward of the two coolant discharge passages 44b, among the passages 50. Therefore, the end portion of the bypass flow path 80 on the arrow B1 side meanders between the two coolant discharge passages 44b and the rest of the passages 50.

As shown in FIG. 3, in the present embodiment, the power generation cell 12 has two coolant supply passages 44a at the ends on the arrow B2 side. Each of the coolant supply passages 44a is disposed between three reactant gas passages 50 arranged in the vertical direction. Therefore, the bypass flow pass 80 has passage detouring portions 94 for detouring outwardly of the passages 50 adjacent to the coolant supply passages 44a. As shown in FIG. 2, the power generation cell 12 has two coolant discharge passages 44b at the ends on the arrow B1 side. In the vicinity of the coolant discharge passages 44b, the bypass flow path 80 also has passage detouring portions 94 for detouring outwardly of the reactant gas passages 50 arranged adjacent to the two coolant discharge passages in the vertical direction.

As shown in FIG. 3, the surrounding flow paths 86 are flow paths provided individually around the two coolant supply passages 44a. The surrounding flow paths 86 are flow paths formed by the recesses defined by the protruded portions forming the first passage seals 54 (see FIG. 2) of the first separator 30 and by the recesses defined by the protruded portion forming the second passage seals 60 (see FIG. 2) of the second separator 32. The surrounding flow paths 86 are also provided around the two coolant discharge passages 44b shown in FIG. 2. The surrounding flow paths 86 are disposed closer to the coolant supply passages 44a or the coolant discharge passages 44b than the bypass flow path 80.

The surrounding flow paths 86 communicate with the cooling flow path 70 for cooling the power generating portion and the bypass flow path 80, through the main supply flow paths 82 and the main discharge flow paths 88 (see FIG. 2).

As shown in FIG. 3, the coolant supply passage 44a has a portion adjacent to the power generating portion, and the main supply flow paths 82 extend from the portion of the coolant supply passage 44a toward the cooling flow path 70 for cooling the power generating portion. The main supply flow paths 82 extend in the direction of the arrow B. In the present embodiment, a plurality of main supply flow paths 82 are provided spaced apart in the vertical direction. The plurality of main supply flow paths 82 constitute a main supply flow path group 84. The main supply flow paths 82 intersect the bypass flow path 80 in the direction of the arrow B. The main supply flow paths 82 are in fluid communication with the coolant supply passage 44a, the bypass flow path 80, and the cooling flow path 70 for cooling the power generating portion.

As shown in FIG. 2, the main discharge flow paths 88 extend from the side portions of the coolant discharge passages 44b toward the power generating portion, the side portions on the side of the power generating portion. The main discharge flow paths 88 is provided in plural. The plurality of main discharge flow paths 88 constitute a main discharge flow path group 89.

As shown in FIG. 3, the bubble release flow path 90 extends from an upper portion of the coolant supply passage 44a upward in the gravity direction toward the bypass flow path 80, and connects the coolant supply passage 44a to the bypass flow path 80. The bubble release flow path 90 is provided at a portion separated from the side portion of the coolant supply passage 44a where the side portion faces the power generating portion. The bubble release flow path 90 is inclined upward with respect to the main supply flow paths 82 by 30° or more. As the inclination angle of the bubble release flow path 90 approaches the gravity direction, the flow velocity v of the coolant inside the bubble release flow path 90 in the direction of the arrow B1 decreases. Further, the distance L between the bubble release flow path 90 and the main supply flow paths 82 can be increased, and the backflow of the bubbles through the bypass flow path 80 can be desirably prevented.

The bubble release flow path 90 extends toward the passage 50 (first fuel gas discharge passage 46b1) immediately above the upper coolant supply passage 44a. The bubble release flow path 90 joins the bypass flow path 80 at the first merging portion 92a of the passage detouring portion 94 of the bypass flow path 80. The bypass flow path 80 allows the coolant to flow from the main supply flow paths 82 toward the main discharge flow paths 88. The passage detouring portion 94 provided with the first merging portion 92a of the bypass flow path 80 is a portion through which the coolant flows in the arrow B2 direction opposite to the arrow B1 direction, which is the flow direction of the coolant in the main supply flow paths 82. Since the bubbles are released along the flow of the coolant in the passage detouring portion 94, the bypass flow path 80 can prevent the bubbles from flowing into the cooling flow path 70 for cooling the power generating portion.

The distance L between the first merging portion 92a at which the bubble release flow path 90 and the bypass flow path 80 merge and the second merging portion 92b at which the uppermost main supply flow path 82 of the main supply flow path group 84 and the bypass flow path 80 merge is larger than the interval between the main supply flow paths 82 in the main supply flow path group 84.

In this embodiment, the bubble release flow path 90 includes a first path 90a connecting the coolant supply passage 44a and the surrounding flow path 86, and a second path 90b connecting the surrounding flow path 86 and the bypass flow path 80. The second path 90b is arranged on the arrow B2 side (outside) further away from the power generating portion than the first path 90a.

In the embodiment shown in FIG. 3, the bubble release flow path 90 is provided only to the upper coolant supply passage 44a, but the present embodiment is not limited to this, and the bubble release flow path 90 may be provided to the lower coolant supply passage 44a.

Figure 4:
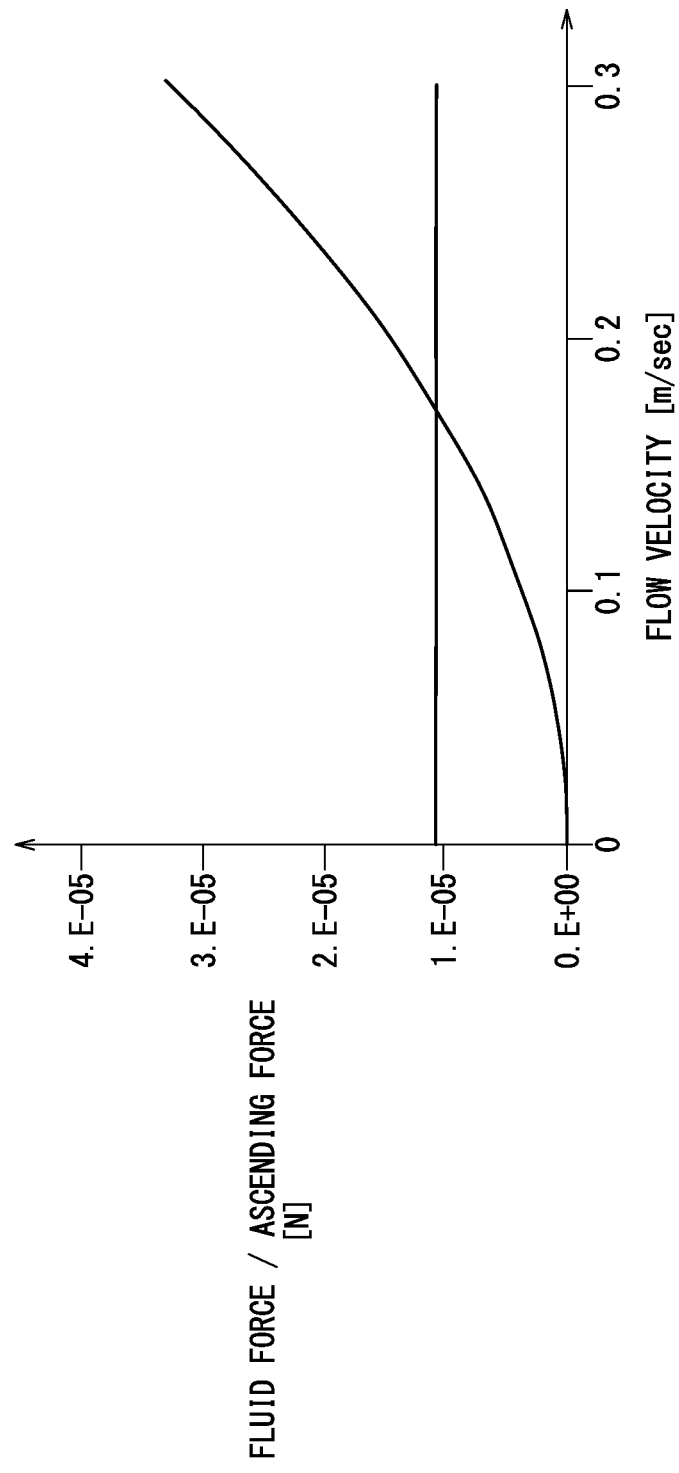
FIG. 4 is a graph showing the relationship between the fluid force of the coolant and the ascending force of bubbles in a coolant supply passage.

From the viewpoint of preventing the inflow of bubbles into the cooling flow path 70 for cooling the power generating portion, the bubbles are more separated from the coolant upward when the fluid force (jet force) of the coolant from the coolant supply passage 44a to the main supply flow paths 82 is smaller than the buoyant (ascending) force of the bubbles. The fluid force of the coolant is determined by a product of the density p of the coolant, the cross-sectional area S of the main supply flow path 82, and the square of the flow velocity v of the coolant. As shown in FIG. 4, the fluid force of the coolant increases as the flow velocity v increases. The main supply flow paths 82 causes pressure loss so that the fluid force of the coolant is to be smaller than the buoyant force of the bubbles. It is preferable that the main supply flow paths 82 have smaller cross-sectional areas S and longer lengths from the viewpoint of generating such pressure loss and allowing the fluid force of the coolant to be smaller than the buoyant force of the bubbles in the coolant.

The fuel cell stack 10 of this embodiment is configured as described above, and its operation will be described below.

Figure 5:
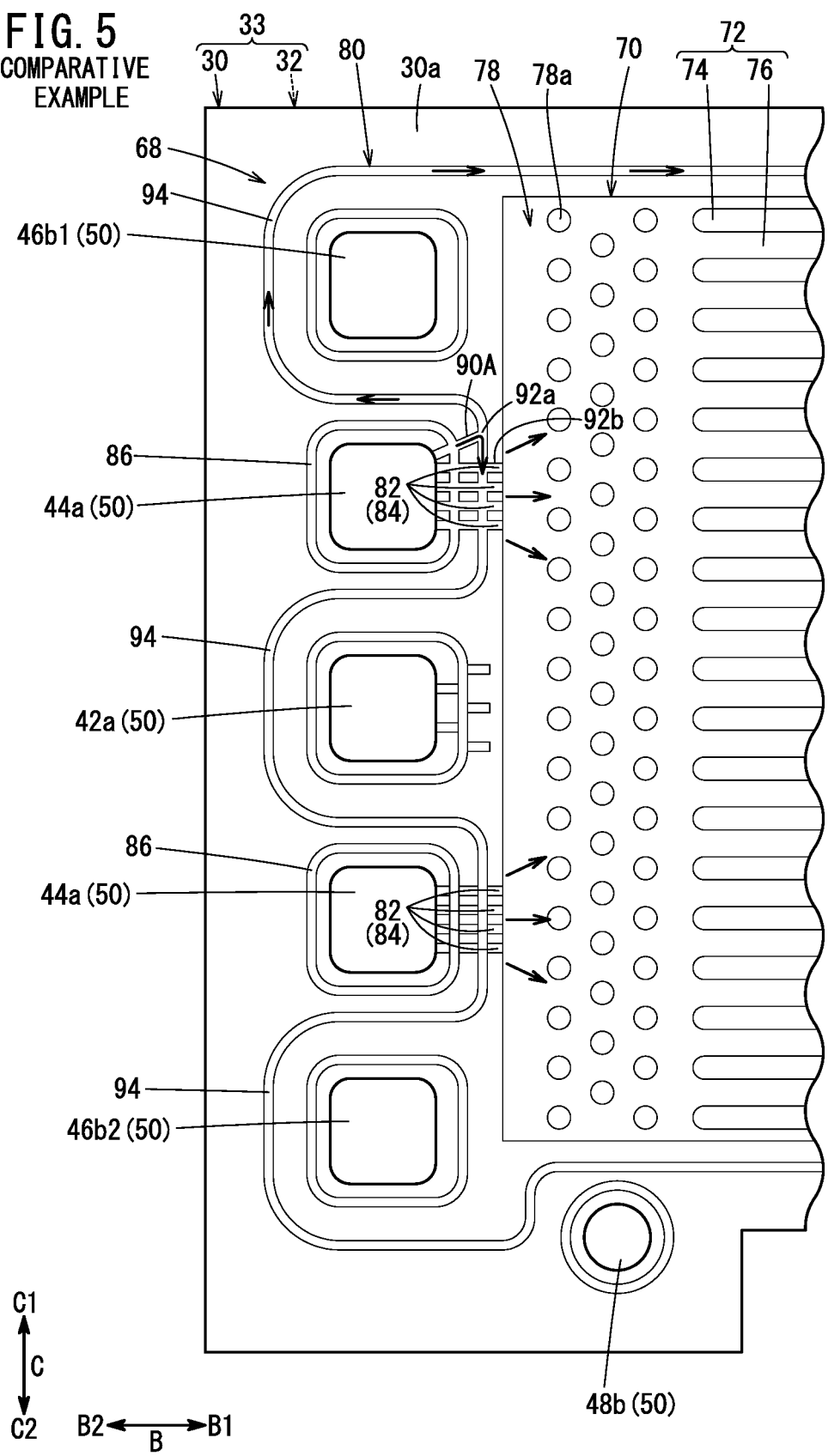
FIG. 5 is an explanatory view showing a separator according to a comparative example and flow of bubbles therein.

Prior to the description of the fuel cell stack 10 of the embodiment, a comparative example will be described. In the joint separator 33 according to the comparative example shown in FIG. 5, the bubble release flow path 90A is provided in the vicinity of the main supply flow paths 82 in the coolant flow field 68. In the bubble release flow path 90A according to the comparative example, a part of the bubbles flowing into the bypass flow path 80 flows toward the main supply flow paths 82 as indicated by the arrow in FIG. 5, and enters the cooling flow path 70 for cooling the power generating portion, so that the bubbles block the flow path grooves 74.

Figure 6:
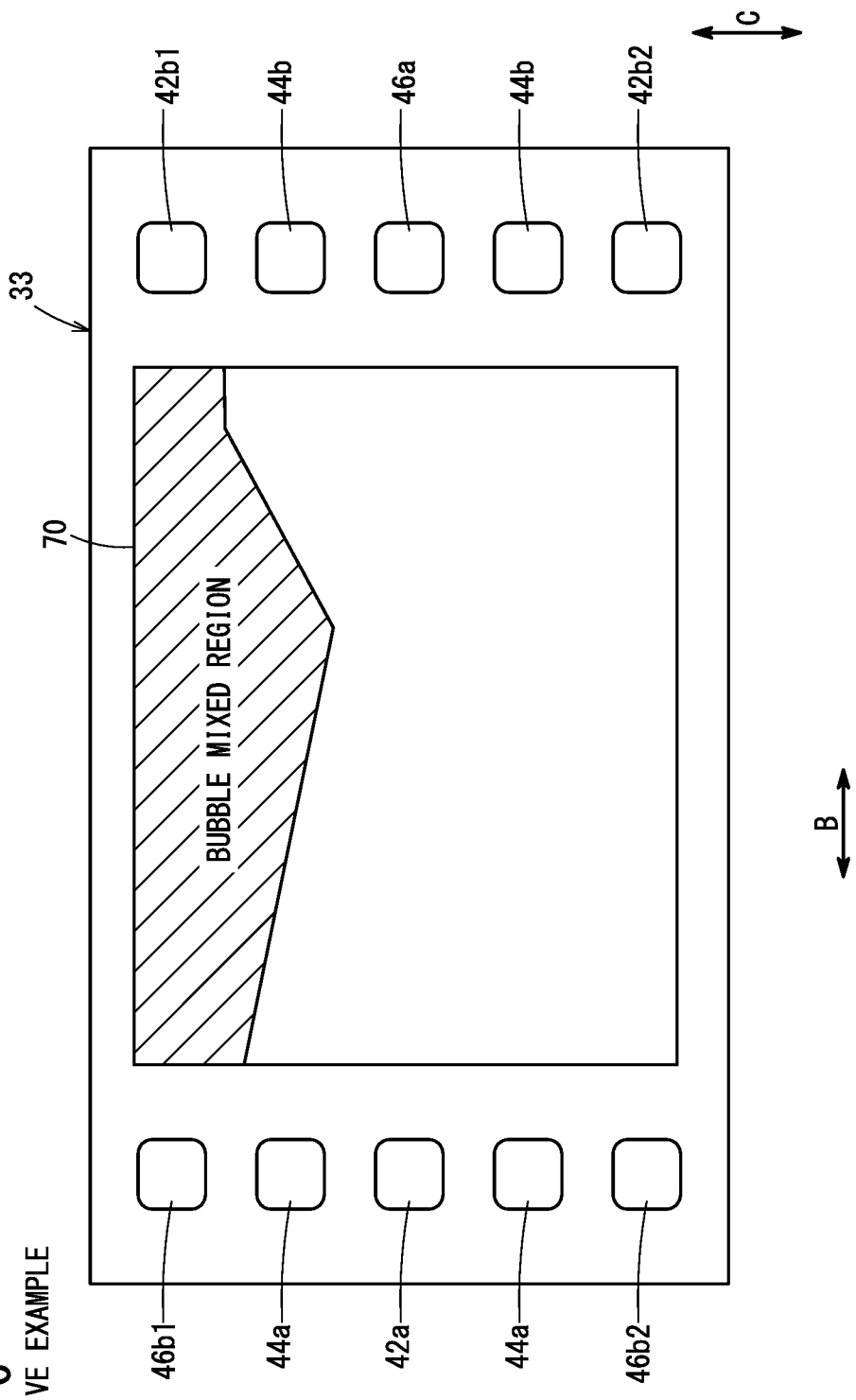
FIG. 6 is an explanatory view showing a bubble mixed region in the separator according to the comparative example.

As shown in FIG. 6, in the case of the comparative example, the bubbles enter a wide range of the cooling flow path 70 for cooling the power generating portion.

Figure 7:
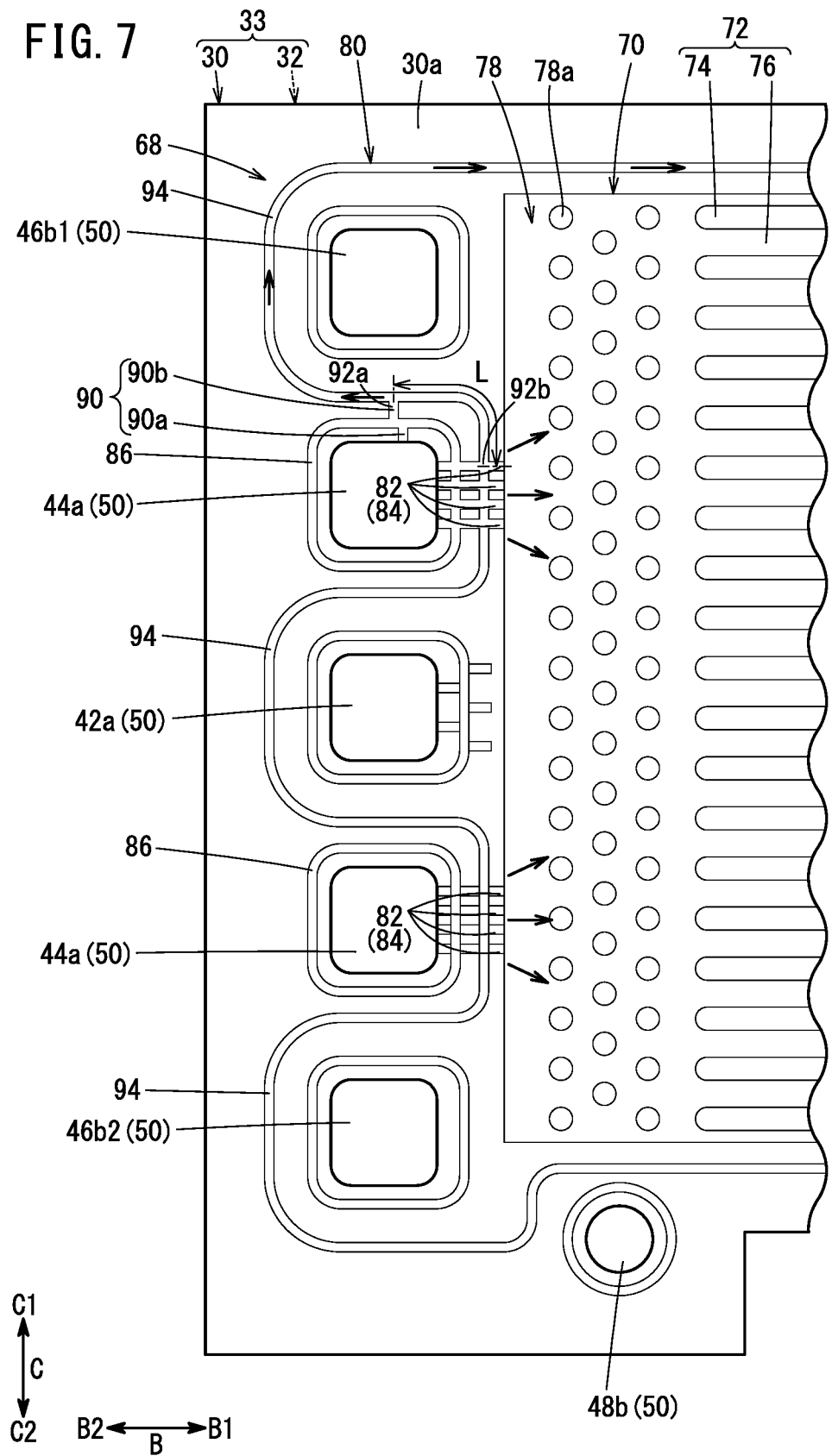
FIG. 7 is an explanatory view showing a separator according to the embodiment and flow of bubbles therein.

On the other hand, in the joint separator 33 according to the present embodiment shown in FIG. 7, the bubble release flow path 90 extends toward the passage 50 immediately above the upper coolant supply passage 44a, and the distance L between the bubble release flow path 90 and the main supply flow paths 82 is larger than that in the comparative example. Further, the bubble release flow path 90 is connected to the bypass flow path 80 in a direction in which the flow velocity component in the direction of the arrow B1 becomes low. Therefore, the bubbles flowing into the bypass flow path 80 from the bubble release flow path 90 flow upward by the buoyant force along the flow of the coolant in the bypass flow path 80 as shown by the arrows. Further, since the distance L between the bubble release flow path 90 and the main supply flow paths 82 is large and the flow velocity in the direction of the arrow B1 is small, the backflow in the bypass flow path 80 can be prevented and the inflow of bubbles into the main supply flow paths 82 can be suppressed.

Therefore, the fuel cell stack 10 can prevent the mixing of bubbles with the coolant flowing into the cooling flow path 70 for cooling the power generating portion, through the main supply flow paths 82, and can prevent the flow path grooves 74 from being blocked.

Figure 8:
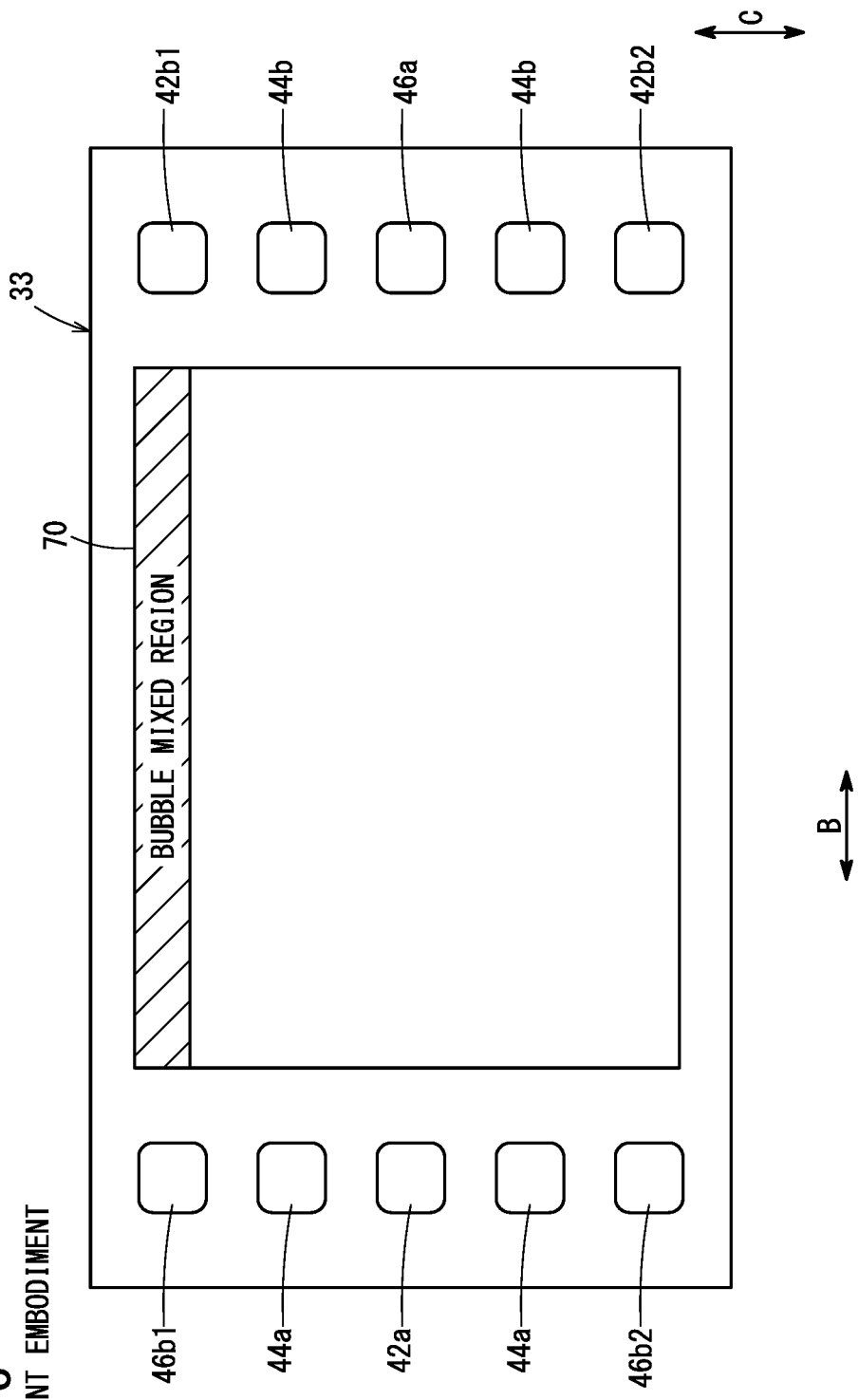
FIG. 8 is an explanatory view showing a separator according to the embodiment and a bubble mixed region thereof.

As shown in FIG. 8, according to the present embodiment, bubbles are mixed only in a limited area near the upper end of the cooling flow path 70 for cooling the power generating portion, and as a result, the bubble mixed region is significantly reduced compared to the comparative example.

Figure 9:
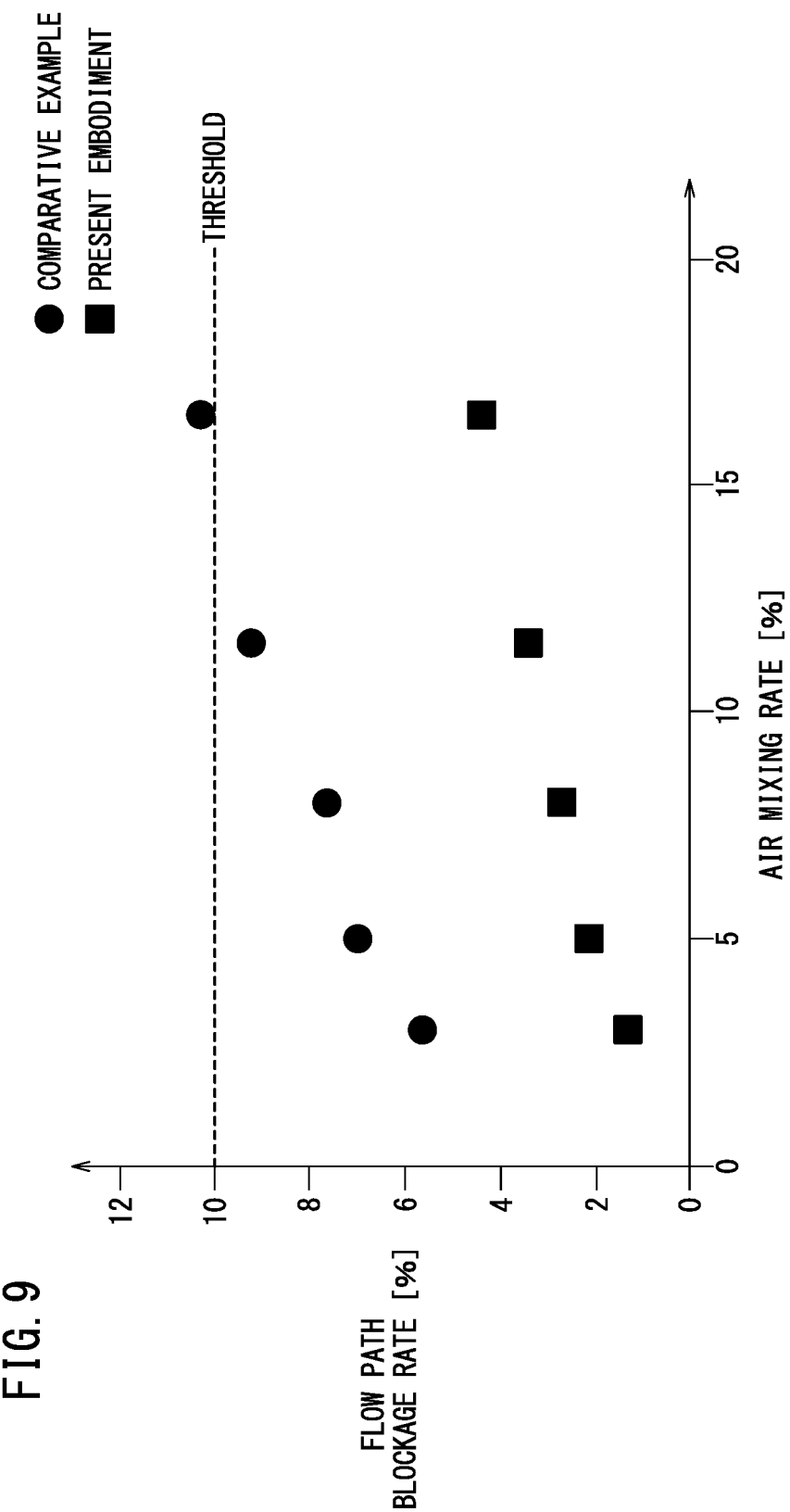
FIG. 9 is a graph showing an air mixing rate in the coolant, the flow field blockage rate of the separator, and the measurement results according to the comparative example and the present embodiment.

FIG. 9 shows the results of measurement of the blockage rate by bubbles in the flow path grooves 74 when the coolant mixed with air flows through the joint separators 33 of the comparative example and the present embodiment. As shown in FIG. 9, in the joint separators 33 of the comparative example and the present embodiment, the flow path blockage rate increases with the increase in the air mixing rate of the coolant. According to the joint separator 33 of the present embodiment, even when the air mixing rate is increased, the flow path blockage rate is suppressed more than the result of the comparative example.

The fuel cell stack 10 of this embodiment has the following effects.

In the present embodiment, the fuel cell stack 10 includes the plurality of power generation cells 12 stacked one another, each of the power generation cells including the membrane electrode assembly 28a and the pair of separators 30, 32 sandwiching the membrane electrode assembly 28a, wherein the fuel cell stack includes the coolant flow field 68 formed between protruded portions of the separators 30, 32 adjacent to each other, the coolant supply passage 44a allowing the coolant to flow into the coolant flow field 68, and the coolant discharge passage 44b allowing the coolant to flow out of the coolant flow field 68, wherein the coolant flow field 68 includes: the cooling flow path 70 for cooling a power generating portion of the membrane electrode assembly 28a, the cooling flow path containing a portion overlapping the power generating portion of the membrane electrode assembly 28a; a bypass flow path 80 provided on the outer peripheries of the separators 30, 32, the bypass flow path being formed inside the protruded portions of flow field seals for sealing reactant gas flow fields formed between the separators 30, 32 and the membrane electrode assembly 28a; the main supply flow path 82 extending from a portion of the coolant supply passage 44a on the side of the cooling flow path 70 for cooling the power generating portion, intersecting the bypass flow path 80, and extending further toward the cooling flow path 70 for cooling the power generating portion, the main supply flow path connecting the coolant supply passage 44a and the cooling flow path 70 for cooling the power generating portion; and the bubble release flow path 90 extending from an upper portion of the coolant supply passage 44a in the gravity direction toward the bypass flow path 80 and connected to the bypass flow path 80.

In the fuel cell stack 10 having the above-described configuration, since the bubble release flow path 90 faces upward, bubbles in the coolant can flow into the bypass flow path 80 by taking advantage of the buoyant force thereof. By the pressure difference between the coolant supply passage 44a and the coolant discharge passages 44b, the bypass flow path 80 allows the coolant mixed with bubbles to flow into the coolant discharge passages 44b while bypassing the power generating portion. Further, since the bubble release flow path 90 faces the upper passage 50, the distance L up to the main supply flow paths 82 along the bypass flow path 80 is increased, so that the backflow of the coolant flowing from the bubble release flow path 90 into the bypass flow path 80 can be prevented, and the mixing of bubbles through the main supply flow paths 82 can be more effectively prevented.

In the fuel cell stack 10 described above, the main supply flow path 82 is provided in plural to constitute the main supply flow path group 84, and the distance L between the first merging section 92a where the bubble release flow path 90 and the bypass flow path 80 merge and the second merging section 92b where the uppermost main supply flow path 82 of the main supply flow path group 84 and the bypass flow path 80 merge is larger than the interval between the main supply flow paths 82 in the main supply flow path group 84. In the fuel cell stack 10 of this configuration, since the distance L between the main supply flow path 82 and the bubble release flow path 90 along the bypass flow path 80 becomes large, it is possible to prevent bubbles in the coolant in the bypass flow path 80 from flowing back and around toward the main supply flow paths 82, and to suppress the mixing of bubbles into the cooling flow path 70 of the power generating portion.

In the fuel cell stack 10 described above, the bubble release flow path 90 may be inclined upward in the gravity direction by 30° or more with respect to the direction in which the main supply flow path 82 extends. The fuel cell stack 10 of this configuration can efficiently flow the coolant mixed with the bubbles in the bubble release flow path 90 by utilizing the buoyant force of the bubbles.

In the fuel cell stack 10 described above, the bubble release flow path 90 may extend toward the passage 50 immediately above the coolant supply passage 44a in the gravity direction.

In the fuel cell stack 10 described above, the bypass flow path 80 may have the passage detouring portion 94 for detouring outwardly of the passage 50 immediately above the coolant supply passage 44a in the gravity direction, and the bubble release flow path 90 may be connected to a portion of the passage detouring portion 94 at which the coolant flows in the direction opposite to the flow direction of the coolant in the cooling flow path 70 for cooling the power generating portion. The fuel cell stack 10 of this configuration can prevent the backflow of air bubbles in the bypass flow path 80, and can prevent air bubbles from entering the main supply flow paths 82.

The fuel cell stack 10 further comprises the surrounding flow path 86 provided between the bypass flow path 80 and the coolant supply passage 44a and formed inside the protruded portions of the passage seals 54, 60 surrounding the coolant supply passage 44a, wherein the bubble release flow path 90 includes the first path 90a connecting the coolant supply passage 44a to the surrounding flow path 86 and the second path 90b connecting the surrounding flow path 86 to the bypass flow path 80, and the second path 90b is arranged around the first path 90a (on the side away from the power generating portion than the first path 90a). In the fuel cell stack 10 of this configuration, by making the substantial inclination angle of the bubble release flow path 90 closer to the vertically upward direction, it is possible to discharge bubbles more efficiently by utilizing the buoyant force of the bubbles. Further, since the distance L between the bubble release flow path 90 and the main supply flow paths 82 becomes large, it is possible to prevent the mixing of bubbles due to the backflow.

In the fuel cell stack 10 described above, the cross-sectional area S of the main supply flow path 82 may be limited to a range capable of maintaining a flow velocity v at which the buoyant force of bubbles in the coolant inside the coolant supply passage 44a is greater than the fluid force of the coolant flowing from the coolant supply passage 44a toward the main supply flow path 82. Here, the buoyant force of bubbles is the buoyant force of bubbles larger than a predetermined size that may block the flow path grooves 74 of the cooling flow path 70 for cooling the power generating portion. Based on FIG. 4, the flow velocity v of the coolant flowing from the coolant supply passage 44a toward the main supply flow paths 82 can be, for example, 0.17 m/sec or less. In the fuel cell stack 10 having this configuration, bubbles can be separated from the coolant inside the coolant supply passage 44a, and bubbles can be efficiently removed through the bubble release flow path 90. As a result, the fuel cell stack 10 can reduce the entry of bubbles into the cooling flow path 70 for cooling the power generation section.

In the fuel cell stack 10 described above, the plurality of coolant supply passages 44a may be spaced from each other in the gravity direction, and at least the uppermost coolant supply passage 44a may be provided with the bubble release flow path 90. In the fuel cell stack 10 of this configuration, it is possible to efficiently separate and remove bubbles from the coolant flowing through the uppermost coolant supply passage 44a in which the number of bubbles mixed into the coolant is relatively large.

Although preferred embodiments of the present invention have been described above, the present invention is not limited to the above-described embodiments, and various modifications can be made without departing from the gist of the present invention.

What is claimed is:

1. A fuel cell stack includes a plurality of power generation cells stacked one another, each of the power generation cells including a membrane electrode assembly and a pair of separators sandwiching the membrane electrode assembly, comprising:
   a coolant flow field formed between protruded portions of the separators adjacent to each other;
   a coolant supply passage allowing a coolant to flow into the coolant flow field; and
   a coolant discharge passage allowing the coolant to flow out of the coolant flow field,
   wherein the coolant flow field includes:
   a cooling flow path for cooling a power generating portion of the membrane electrode assembly, the cooling flow path containing a portion overlapping the power generating portion of the membrane electrode assembly,
   a bypass flow path provided on outer peripheries of the separators, the bypass flow path being formed inside protruded portions of flow field seals for sealing reactant gas flow fields formed between the separators and the membrane electrode assembly,
   a main supply flow path extending from a portion of the coolant supply passage on a side of the cooling flow path for cooling the power generating portion, intersecting the bypass flow path and further extending toward the cooling flow path for cooling the power generating portion, the main supply flow path connecting the coolant supply passage and the cooling flow path for cooling the power generating portion, and
   a bubble release flow path extending from an upper portion of the coolant supply passage in a gravity direction toward the bypass flow path and connected to the bypass flow path.

2. The fuel cell stack according to claim 1, wherein the main supply flow path is provided in plural to constitute a main supply flow path group, and a distance between a first merging section where the bubble release flow path and the bypass flow path merge and a second merging section where an uppermost main supply flow path of the main supply flow path group and the bypass flow path merge is larger than an interval between the main supply flow paths in the main supply flow path group.

3. The fuel cell stack according to claim 1, wherein the bubble release flow path is inclined upward in the gravity direction by 30° or more with respect to a direction in which the main supply flow path extends.

4. The fuel cell stack according to claim 1, wherein the bubble release flow path extends toward a passage immediately above the coolant supply passage in the gravity direction.

5. The fuel cell stack according to claim 1, wherein the bypass flow path has a passage detouring portion for detouring outwardly of a passage immediately above the coolant supply passage in the gravity direction, and
the bubble release flow path is connected to a portion of the passage detouring portion at which the coolant flows in a direction opposite to a flow direction of the coolant in the cooling flow path for cooling the power generating portion.

6. The fuel cell stack according to claim 5, further comprising a surrounding flow path provided between the bypass flow path and the coolant supply passage and formed inside protruded portions of passage seals surrounding the coolant supply passage, wherein
the bubble release flow path includes a first path connecting the coolant supply passage to the surrounding flow path and a second path connecting the surrounding flow path to the bypass flow path, and the second path is arranged around the first path.

7. The fuel cell stack according to claim 2, wherein a cross-sectional area of the main supply flow path is limited to a range capable of maintaining a flow velocity at which a buoyant force of bubbles in the coolant inside the coolant supply passage is greater than a fluid force of the coolant flowing from the coolant supply passage toward the main supply flow path.

8. The fuel cell stack according to claim 1, wherein the coolant supply passage is provided in plural with space from each other in the gravity direction, and at least an uppermost coolant supply passage is provided with the bubble release flow path.

* * * * *